United States Patent Office 3,010,374
Patented Nov. 28, 1961

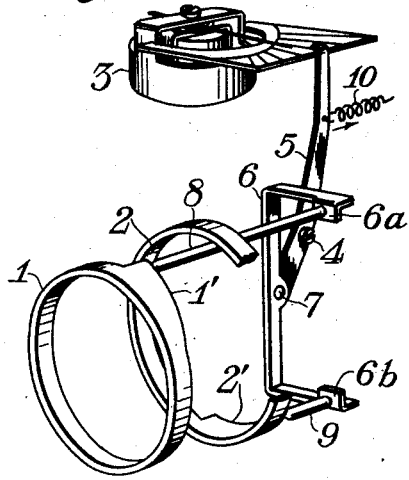
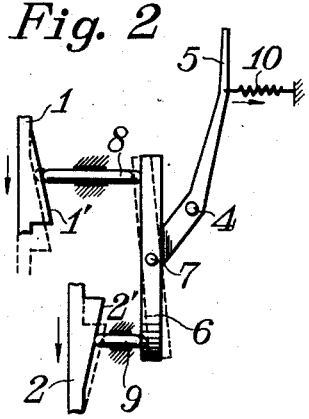
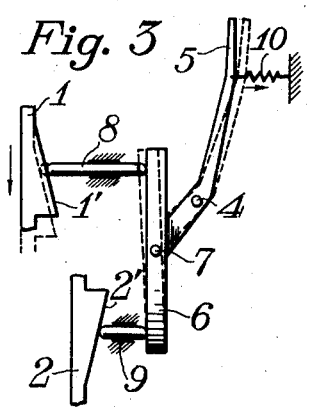
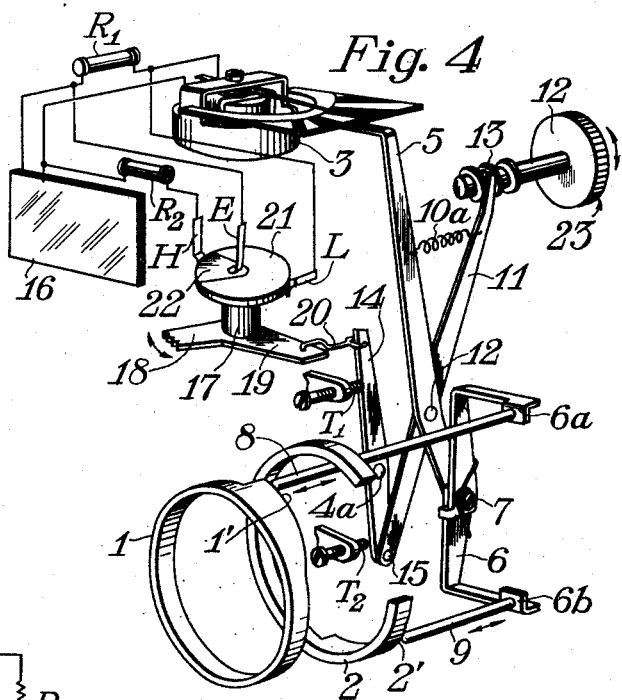
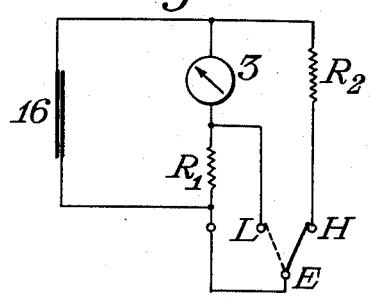

3,010,374
PHOTOGRAPHIC CAMERA EQUIPPED WITH AN EXPOSURE METER
Kenji Hiruma, Tokyo, Japan, assignor to Riken Kogaku Kogyo Kabushiki Kaisha, Tokyo, Japan, a company of Japan
Filed Oct. 31, 1958, Ser. No. 771,107
Claims priority, application Japan Oct. 31, 1957
2 Claims. (Cl. 95—10)

This invention relates to a photographic camera equipped with a between-the-lens shutter and an interconnected exposure meter, wherein an improved mechanism is provided for obtaining a correct shutter time by manually rotating the exposure time adjustment ring and/or the aperature adjustment ring.

The object of the invention is to provide such apparatus which is simple and compact in construction, economical to manufacture, can readily be assembled, and is reliable in operation.

According to this invention, said mechanism comprises an exposure time adjustment ring bearing a uniform or linear scale, an aperture adjustment ring bearing a uniform or linear scale, each of the said exposure time adjustment ring and the aperture adjustment ring having a cam face on its periphery, a pivoted lever, and two intermediary elements movable in the direction of the optical axis of the lens engaging with said cam faces on the exposure time adjustment ring and on the aperture adjustment ring and operatively connected with said lever, the arrangement being such that the combined displacement of said two intermediary elements is transmitted to one arm of said pivoted lever and moving the other arm of said lever to follow up the position of the pointer of the exposure meter.

The accompanying drawing will serve to illustrate specific embodiments of the invention, in which:

FIGURE 1 is a schematic perspective view of the essential portion of the mechanism in the camera according to this invention, FIGURES 2 and 3 are diagrammatic views showing the operation thereof.

FIGURE 4 is a schematic perspective view of a modified form of the mechanism according to the invention, in which compensating device with respect to the exposure meter and the light sensitive material are incorporated, and FIGURE 5 is a wiring diagram of the control circuit for the exposure meter shown in FIGURE 4.

Referring to FIGURE 1 of the accompanying drawing, 1 designates an exposure time adjustment ring of a between-the-lens shutter. 2 is an aperture adjustment ring, and 3 designates an exposure meter. Each of said two rings 1 and 2 bears uniform or linear scale, and it is to be noted that by rotating said two rings as an entirety about the optical axis of the lens the exposure time given by the shutter is not varied, whilst when the two rings make a relative angular displacement for one grade of the scale the exposure twice or one half of the exposure time before adjustment may be obtained. Said rings 1 and 2 are provided on the peripheries thereof with cam faces 1' and 2', respectively, each varying its height toward the direction parallel to the optical axis of the lens, and said cam faces of the two rings are arranged in symmetrical relation to each other. 5 is a lever pivoted as at 4 in the camera. The upper arm of said lever is adapted to travel across the scale markings on the exposure meter 3, and to the other arm of said lever there is pivotally mounted as at 7 the mid-point of the bottom bar of a U-shaped lever 6, said bottom bar being adapted to be oscillated about said pivot 7 in a plane parallel to the optical axis of the lens. Two legs of said U-shaped lever 6 have bent portions 6a and 6b, respectively. There is a distance piece 8 between said bent portion 6a and the cam 1' on the ring 1. Between the bent portion 6b and the cam 2' on the ring 2, there is a distance piece 9. Said distance pieces 8 and 9 are parallel to each other and are supported by suitable means so as to be slidable in axial direction. The lever 5 is biased by a spring 10 which tends to turn the lever in the clockwise direction about the pivot 4. As the cam faces 1' and 2' are in symmetrical relation, as seen from FIGURE 2, when the same are rotated as an entirety about the optical axis of the lens, the U-shaped lever 6 is merely oscillated about the pivot 7 on the mid-point of the bottom bar, and the position of said pivot 7 will not be displaced at all. Consequently, the lever 5 will not be moved. On the other hand, when either the ring 1 or the ring 2 is rotated, for instance, when the exposure time adjustment ring 1 only is rotated about said optical axis, maintaining the aperture adjustment ring 2 stationary, the pivot 7 connecting the bottom bar of the U-shaped lever 6 and the lever 5 will be moved about the pivot 4 of the lever 5, whereby said lever 5 will be oscillated about the pivot 4. The shape of the cam face 1' on the exposure adjustment ring 1 is so designed that when said ring 1 is rotated for one degree of the scale thereon, while maintaining the aperture adjustment ring 2 stationary, the free end of the upper arm of the lever 5 is angularly displaced to a point next to the point indicated by the pointer on the scale markings of the exposure meter 3 representing the light value. By such arrangement, on the other hand, when the ring 2 is rotated for one grade of the scale thereon, while maintaining the ring 1 stationary, the free end of the upper arm of the lever 5 will be angularly displaced substantially to a point next to the point indicated by the pointer of the exposure meter 3 on the scale markings. As the pivot 7 moves along an arcuate path, if the cam faces 1' and 2' are arranged in exactly symmetrical relation, the angular displacement of the lever 5 when the ring 2 is rotated with the ring 1 kept stationary would not be exactly same as the angular displacement of the lever 5 when the ring 1 is rotated with the ring 2 kept stationary. But, it will be noted that by suitably designing the arrangement it would be possible to keep such difference negligibly small, and that said angular displacement with respect to both cases may be considered practically equal.

In the modified embodiment shown in FIGURE 4, means are incorporated for making exposure compensation and the compensation according to the sensitivity of the light sensitive material used. In this embodiment, the lever 5 of which one end is pivoted as at 7 to the mid-point of the U-shaped lever 6 is not pivoted to the immovable part of the camera, but is designed as a floating lever. This lever 5 is pivoted to another floating lever 11 as at 12. One end of said second floating lever 11 is engaged with a helicoid 13 on the axis of the knob 12 for making the compensation according to the sensitivity of the light sensitive film. The other end of said second floating lever 11 is pivoted as at 15 to one end of a lever 14 which is pivoted as at 4a to an immovable part of the camera. A compression spring connecting said two floating levers 5 and 11 has a tendency of holding the distance pieces 8 and 9 in engagement with the ends of the U-shaped lever 6 and the cam faces 1' and 2' on the exposure time adjustment ring 1 and the aperture adjustment ring 2, respectively. The periphery of said knob 12 bears the light sensitivity value, for instance of ASA unit, which is readable by a pointer mark 23 on an immovable part of the camera.

It is to be noted that the exposure meter 3 shown in FIGURE 4 is of such type that the generated photo-electric current may be varied by providing a booster (not shown) or by providing means for varying the effective area of the light receiving plate of the exposure meter. The device shown in FIGURE 4 is provided with the compensating means adapted to functioning according to said variation of the electromotive force. A vertical stud 17 of an insulating material is pivotally mounted upon an immovable part of the camera. This stud has a switching lever 18 and an arm 19 extending radially. The arm 19 is connected by means of a link 20 to the other end of said lever 14. Secured to the upper end of the vertical stud 17 there is a disc 21 made of insulating material. A portion of said disc 21, including the center thereof, is provided with a sector 22 made of conductive material. Two contacts L and H are normally in contact with the periphery of the disc 21 and, at the center thereof, there is a contact E normally in contact with the sector 22. When the switching lever 18 is turned clockwise or counter-clockwise around the axis of the stud 17, either one of the contacts L and H will be put in the circuit through the conductive sector 22. The turn of said switching lever 18 is limited by means of stoppers $T_1$ and $T_2$ engageable with the lever 14. Through resistances $R_1$ and $R_2$, said contacts E, L and H are connected to the exciting coil and the photo-electric plate 16 of the exposure meter 3 in the circuit as shown in FIGURE 5.

In the embodiment of FIGURE 4, assuming that the switching bar 18 and the knob 23 are held stationary in the predetermined normal position, the floating lever 11 and the lever 14 may be assumed to form stationary elements, and the lever 5 will function just in the same manner as described with respect to the arrangement shown in FIGURE 1. When the knob 23 is actuated with the switching lever 18 held stationary, the floating lever 11 will be rocked around the pivot 15, whereby the pivot 12 of the lever 5 will be displaced to make compensation of the reading of the exposure meter 3. On the other hand, when the switching lever 18 is turned, with the said knob 23 held stationary, the connection of the contact E is turned over from H to L in the circuit and, at the same time, the lever 14 is rocked around the pivot 4a, thereby displacing the pivot 5 of the floating lever 5, whereby the reading of the exposure meter will be compensated as desired.

From the foregoing, it will be seen that according to this invention either the exposure adjustment ring 1 or the aperture adjustment ring 2 is set to the desired scale upon predetermining either the exposure time or the f-value, and then upon setting the camera against the object to be photographed the other ring is rotated so as to bring the free end of the upper arm of the lever 5 into register with the reading of the pointer of the exposure meter 3 on the scale markings thereon, whereby the data required to set the shutter for the correct exposure value may be obtained. Thereafter, if desired, another data required for obtaining correct exposure value for the same object may be obtained by rotating both rings 1 and 2 as an entirety.

Heretofore it has been proposed to provide a camera equipped with a between-the-lens shutter with light value type linear scale and the exposure meter interconnected therewith, wherein relative displacement of mechanical movable elements for setting the shutter is utilized for moving an element following up the displacement of the pointer for the exposure meter. In many of such mechanisms, gear train or the like are provided for transmitting the movement of the movable elements, and such mechanisms are unsuited for a miniature camera. In contrast with such known mechanisms, the mechanism according to this invention may be made extremely compact and simple in construction.

What I claim is:

1. In a camera having a between-the-lens shutter, an exposure meter having a pointer, an exposure control apparatus comprising, in combination, a manually rotatable exposure time adjustment first ring operably connected to the shutter to variably adjust shutter speed as a function of the angular rotation thereof, a rotatable diaphragm aperture adjustment second ring coaxial with the first ring and selectively movable separately from said first ring, each ring having camming surfaces with the camming surfaces of one ring disposed with respect to the other camming surfaces symmetrically about the axis of the two rings, a pivoted first lever, two axially displaceable distance pieces for cooperatively and individually displacing said first lever and extending parallel to the axis of the two rings each having an end portion disposed cooperatively engaging endwise a respective camming surface of a respective ring, the camming surfaces having a varying height in a direction corresponding to a direction toward the distance pieces, a second lever pivotally mounted and having a pivotal connection for said first lever, means providing a pivot for the second lever at a pivotal point separate and spaced axially on the second lever from a pivotal point of the first lever, said first lever having a portion oscillatable in a plane parallel to the distance pieces when said two rings are jointly rotated each in a selected direction and said portion being bodily displaceable in said plane in dependence upon rotation of said rings individually and displacement thereby of said distance pieces axially individually, said second lever being pivotally displaceable in opposite directions in response to said displacement of said first lever, said second lever having an end portion alignable with the pointer of the exposure meter, whereby said end portion of the second lever can be aligned with said pointer when the exposure time and lens aperture adjustment are correctly set by rotating said rings to set a correct exposure time according to an exposure meter reading, means comprising a lever system cooperative with said second lever operable to introduce into said exposure meter settings therein compensating for film sensitivity and including levers in said system to displace said second lever proportionately to said compensating settings introduced into said exposure meter and in a direction to maintain said end portion in alignment with said pointer when said exposure time and lens aperture adjustments are made with said rings.

2. In a camera having a between-the-lens shutter, an exposure meter having a pointer, an exposure control apparatus comprising, in combination, a manually rotatable exposure time adjustment first spring operably connected to the shutter to variably adjust shutter speed as a function of the angular rotation thereof, a rotatable diaphragm aperture adjustment second ring coaxial with the first ring and selectively movable separately from said first ring, each ring having camming surfaces with the camming surfaces of one ring disposed with respect to the other camming surfaces symmetrically about the axis of the two rings, a pivoted first lever two axially displaceable distance pieces for cooperatively and individually displacing said first lever and extending parallel to the axis of the two rings each having an end portion disposed cooperatively engaging endwise a respective camming surface of a respective ring, the camming surfaces having a varying height in a direction corresponding to a direction toward the distance pieces, a second lever pivotally mounted and having a pivotal connection for said first lever, means providing a pivot for the second lever at a pivotal point separate and spaced axially on the second lever from a pivotal point of the first lever, said first lever having a portion oscillatable in a plane parallel to the distance pieces when said two rings are jointly rotated each in a selected direction and said portion being bodily displaceable in said plane in dependence upon rotation of said rings individually and displacement thereby of said distance pieces axially individually, said second lever being pivotally displaceable in opposite directions in response to said displacement of said first lever, said second lever having an end portion alignable with the pointer of the exposure meter, whereby said end portion of the second lever can be aligned with said pointer when the exposure time and lens aperture adjustment are correctly set by rotating said rings to set a correct exposure time according to an exposure meter reading, means comprising a lever system cooperative with said second lever operable to introduce into said exposure meter settings therein compensating for film sensitivity and including levers in said system to displace said second lever proportionately to said compensating settings introduced into said exposure meter and in a direction to maintain said end portion in alignment with said pointer when said exposure time and lens aperture adjustments are made by said rings, said lever system comprising a lever for displacing said pivot for said second lever proportionately to said compensating settings, and means to actuate the last-mentioned lever in dependence upon the compensating settings desired to be introduced into said exposure meter.

References Cited in the file of this patent

UNITED STATES PATENTS

| | | |
|---|---|---|
| 2,340,622 | Simmon | Feb. 1, 1944 |
| 2,341,393 | Simmon | Feb. 8, 1944 |
| 2,343,690 | Mihalyi | Mar. 7, 1944 |
| 2,418,370 | Simmon | Apr. 1, 1947 |
| 2,467,946 | Rossmann et al. | Apr. 19, 1949 |